United States Patent [19]
Barkan et al.

[11] Patent Number: 5,198,651
[45] Date of Patent: Mar. 30, 1993

[54] LASER DIODE DEVICE INCORPORATING STRUCTURE WITH INTEGRAL SCANNING MOTOR

[75] Inventors: Edward Barkan, Setauket; Howard Shepard, Great Neck, both of N.Y.

[73] Assignee: Symbol Technologies, Inc., Bohemia, N.Y.

[21] Appl. No.: 695,075

[22] Filed: May 3, 1991

[51] Int. Cl.$^5$ ............................................. G06K 7/10
[52] U.S. Cl. .................................. 235/472; 235/454; 235/467
[58] Field of Search ............... 235/472, 454, 455, 462, 235/467, 469; 310/51, 91; 248/560

[56] References Cited

U.S. PATENT DOCUMENTS

| | | |
|---|---|---|
| 4,607,156 | 8/1986 | Koppenaal et al. .................. 235/472 |
| 4,896,026 | 1/1990 | Krichener et al. .................. 235/472 |
| 5,015,833 | 5/1991 | Shepard et al. ..................... 235/472 |
| 5,021,641 | 6/1991 | Swartz et al. ....................... 235/472 |

FOREIGN PATENT DOCUMENTS

| | | |
|---|---|---|
| 2727119 | 12/1977 | Fed. Rep. of Germany ........ 360/51 |
| 2231937 | 9/1990 | Japan ..................................... 360/51 |

Primary Examiner—Eugene R. LaRoche
Assistant Examiner—Tan Nguyen

[57] ABSTRACT

A laser scanning device for projecting a laser beam against a target having information contained thereon which is to be scanned by the laser beam. The device is in particular a compact bar code reader which incorporates internal unitary structure with a resiliently mounted integral scanning motor for compactly supporting various laser and optics components for modular installation in the device, and which protects at least the integral scanning motor from external impacts and shock loads.

23 Claims, 3 Drawing Sheets

LASER DIODE DEVICE INCORPORATING STRUCTURE WITH INTEGRAL SCANNING MOTOR

BACKGROUND OF THE INVENTION

1. Field of the Invention

The present invention relates to a laser scanning device for projecting a laser beam against a target having information contained thereon which is to be scanned by the laser beam; and more particularly, relates to a compact laser scanning device which is a bar code reader and which incorporates internal unitary structure with an integral scanning motor for compactly supporting various laser and optics components for modular installation in the device, and which protects at least the integral scanning motor from external impacts and shock loads.

The utilization of laser scanning devices for the scanning or reading of information provided on a target; such as a package or sale item, is well known in the technology and in commerce. In this connection, various types of laser scanning devices incorporate scanning heads which house optical reading systems, such as bar code readers, for the reading of bar code symbols on targets which are scanned by a laser beam projected from the bar code reader. In general, such laser scanning devices; especially in the type of bar code readers, are widely employed in industry and in retail commerce and, for example, may be permanently incorporated in the structures of check-out counters of supermarkets, whereby the items of merchandise having the bar code symbols imprinted thereon or applied thereto are passed over a fixed bar code reader located beneath the counter surface so as to provide a record for the merchant of the merchandise being purchased by a consumer, and concurrently a readout (and possibly a printed record) for the consumer.

The bar code reader or laser scanning device may also be constituted of an optical scanner unit which is fixedly mounted on a stand extending above a support platform or countertop on which the merchandise may be arranged; or alternatively, in many instances of utilization, may be in the form of a miniature, lightweight and gun-shaped device having a pistol grip, wherein the device is normally passed over the bar code symbol which is imprinted on a sale item at some short distance therefrom so as to enable scanning of the information provided by the bar code symbols.

2. Discussion of the Prior Art

Hereby, laser scanning devices in the form of bar code readers are described in detail in U.S. Pat. No. 4,387,297, assigned to the same assignee of the present invention and incorporated by reference herein. Thus, the laser scanning system disclosed in the above-mentioned U.S. Pat. No. 4,387,297 includes a portable hand-held scanning head which may be of any suitable configuration, but preferably has a gun-shaped housing consisting of lightweight plastic, and with a handle and barrel portion of the housing enabled to receive the various components of the scanning head therein. Within the barrel portion there is generally mounted a light source, an optic train including focusing lenses for directing the light beam across a bar code symbol on the target, and sensing means for detecting reflected light from the bar code symbol which is being scanned.

Other structures for laser scanning devices in the form of bar code readers, in addition to the above-mentioned U.S. patent, are also described in more specific detail in U.S. Pat. Nos. 4,760,248; and 4,409,470, all of which are assigned to the same assignee as the present invention and incorporated by reference herein.

The structures of the foregoing patents, and referring particularly to the disclosures of assignee's U.S. Pat. Nos. 4,387,297 and 4,409,470, incorporate shock mountings for protecting the rather delicate operative components of the laser scanning devices from sustaining any damage or even from being entirely destroyed when the devices are subjected to hard impacts or shock loads, such as by being dropped or struck by a hard object.

Another hand-held gun-shaped laser scanning device of that type is disclosed in the Eastman, et al. U.S. Pat. No. 4,652,750. In that instance, a laser diode and optics for forming a scanning beam and a photodetector are mounted as a unitary or modular structure on a printed circuit board enabling the entire arrangement to be fixedly located in the housing of the laser scanning device.

All of the foregoing devices satisfactorily meet the demands of industry in the intended applications thereof, such as through the various configurations and embodiments imparted to the laser scanning devices, particularly such as bar code readers which are well-known in the technology and widely employed in commerce with a large degree of success and consumer acceptance, and which incorporate shock mountings and the like utilized in protecting the rather delicate internal operative components such as the laser generating, optical and scanning motor from damage when the scanning devices are subjected to hard externally-generated impacts or shock loads. Nevertheless, further improvements in protecting these components can be contemplated, for instance, when the laser scanning device is in the form of a hand-held bar code reader, a portable gun-shaped housing member consisting of lightweight plastic containing the operative components, and especially in avoiding any damage to the normally expensive scanning motor which may be contained in the housing member.

SUMMARY OF THE INVENTION

Consequently, in order to provide an improved degree of protection against such damage, especially to the rather delicate scanning motor, the invention contemplates the provision of novel and unique unitary structure of the type referred to hereinabove, in the housing of the laser scanning device, with which structure there are integrally connected flexible mounting supports for the scanning motor or the scanning motor is flexibly mounted itself so as to protect the latter from impact or shock loads received by the scanning device through assumption and dissipation by the structure of impacts and/or shock loads imparted to the device. This type of unitary structure or modular construction not only protects the scanning motor, but the provision of such structure integrated with the scanning motor and various of the optical and laser components enables these to be introduced in a modular form into the housing of the laser scanning device. Accordingly, this results in an inexpensive and compact construction of fewer parts, thereby rendering the entire laser scanning device less expensive to manufacture and easier to assemble while being highly resistant or even impervious to damage resulting from hard impacts or shock loads.

Hereby, in order to provide for the above-mentioned unitary structure which incorporates a shock or impact protective flexible support for a scanning motor integrally therewith for utilization in laser scanning devices of the type described herein, the unitary structure is in the form of compartment or cage-like framework, preferably constituted from a lightweight plastic material, which is readily insertable into the housing of the laser scanning device in conjunction with the laser components, optics, photodetector and at least part of the scanning motor being mounted therein, supported on or along with a printed circuit board contained in the housing. For purposes of providing the flexible support for the scanning motor, the unitary structure has keepers integrally formed or molded within the confines thereof, including flexible arm members which are adapted to engage Mylar (Trademark) film springs of a scanning motor which is in the nature of a Mylar film resonant motor; and, in cases where the scanning motor may be of the type incorporating bearings, such as a D.C., galvo or stepper motor, the motor bearings or bearing supports for such bearings may be molded as integral portions of at least one flexible arm of the unitary structure.

Thus, the flexible Mylar film support arms which are molded as an integral part of the unitary structure are possessed of a sufficient degree of flexibility to provide for the resilient deflection thereof in response to an inadvertent dropping and hard impacting of the laser scanning device so that the resiliently mounted scanning motor is protected from potentially damaging or destructive stresses, and thereby eliminates the need for providing separate shock mountings in order to further reduce the manufacturing costs and installation requirements of the entire arrangement.

In the instance, where the scanning motor employs bearings, the latter may be either molded into the free end of at least one flexible support arm which is an integral part of the unitary compartment structure, or the flexible arm may constitute the bearing support for the scanning motor.

Accordingly, it is an object of the present invention to provide a compact unitary structure which is insertable into the housing of a laser scanning device, such as a bar code reader, for supporting at least some of the components of an optical filter, laser and photodetector, and with a scanning motor being integrally connected with the unitary structure for the resiliently flexible support of the motor.

A more specific object of the invention resides in the provision of a unitary structure of the type described which is insertable in a modular arrangement with operative components into a housing of a hand-held laser scanning device, and wherein the unitary structure has an integral flexible mounting for the scanning motor so as to protect the latter from external impacts or shock loads imparted to the device.

Another object of the present invention is to provide a method for the insertion of the unitary structure as described herein in conjunction with various operative components as a modular arrangement into the housing of a laser scanning device.

BRIEF DESCRIPTION OF THE DRAWINGS

Reference may now be had to the following detailed description of exemplary embodiments of the invention, taken in conjunction with the accompanying drawings; in which.

DETAILED DESCRIPTION

Figure 1:
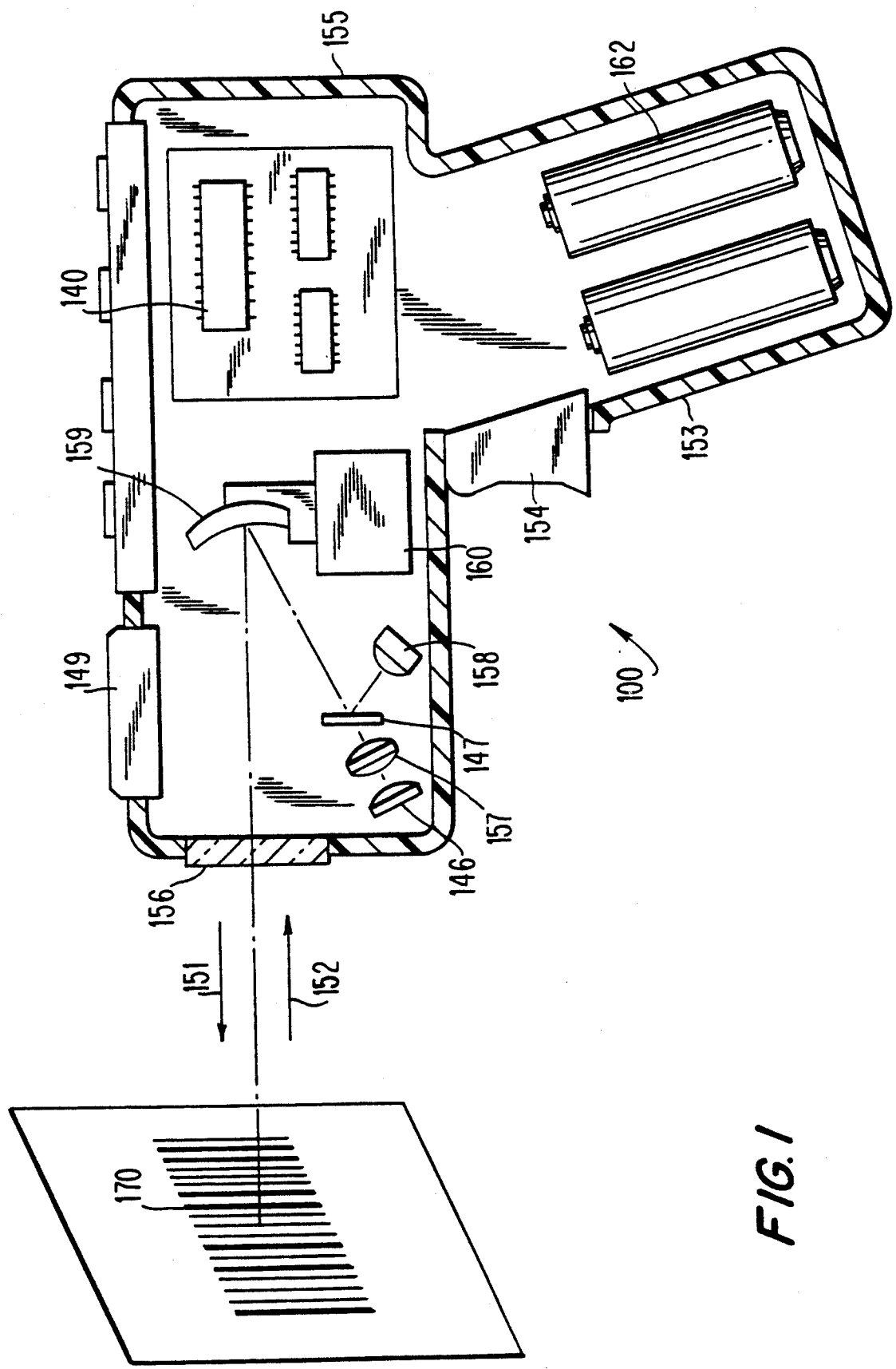
FIG. 1 illustrates a longitudinal sectional side view through an exemplary laser scanning device which is in the form of a hand-held gun-shaped component.

Referring in specific detail to the drawings, as diagrammatically illustrated in FIG. 1, pursuant to a typical exemplary embodiment, a laser scanning device may be a bar code reader unit 100 in a hand-held gun-shaped configuration, although obviously other kinds of configurations of scanners readily lend themselves to the invention, having a pistol-grip type of handle 153 and in which a movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol 110 by the user from a position in which the reader 100 is spaced from the symbol, i.e., not touching the symbol or moving across the symbol. Typically, this type of hand-held bar code reader is specified to operate in the range of from contact with the symbol to distances of perhaps several inches or even further therefrom.

As further depicted in FIG. 1, a suitable lens 157 (or multiple lens system) may be used to focus the scanned beam onto the bar code symbol at an appropriate reference plane. A light source 146, such as a semiconductor laser diode, is positioned to introduce a light beam into the axis of the lens 157, and the beam passes through a partially-silvered mirror 147 and other lenses or beam-shaping structure as needed, along with an oscillating mirror 159 which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

Figure 2:
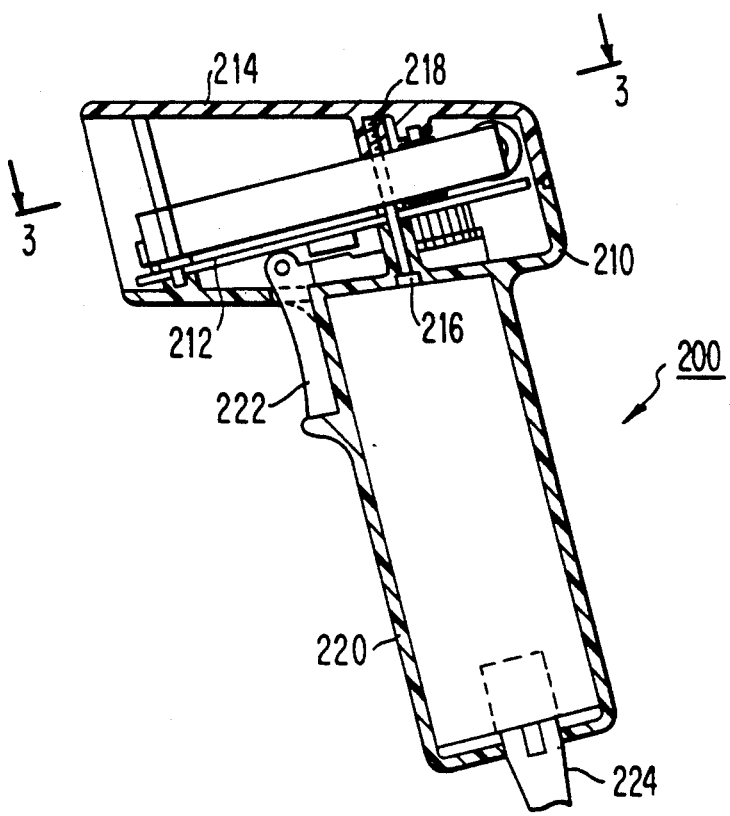
FIG. 2 illustrates the sectional view similar to FIG. 1 through a gun-shaped housing for a laser scanning device pursuant to the invention.
Figure 3:
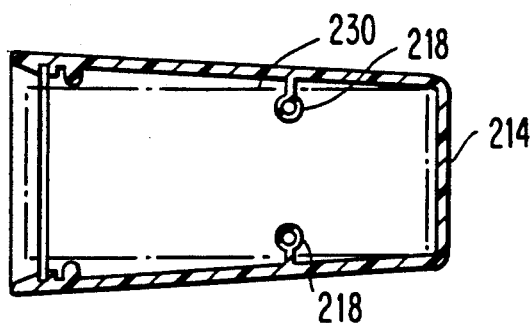
FIG. 3 illustrates a sectional view taken along line 3—3 in FIG. 2.
Figure 4:
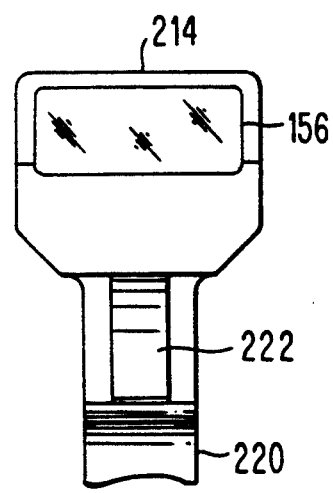
FIG. 4 illustrates a front end view of the laser scanning device of FIG. 2.

Referring in particular to the inventive laser scanning device 200, as shown in FIGS. 2 through 4, a housing 210 of the device 200, the latter of which is essentially a gun-shaped bar code reader unit, includes an upper housing portion 212 adapted to be closed by a top cover 214 which is fastened thereto through the intermediary of fastening screws 216 which are insertable into suitable holes in housing portion 212 in alignment with threaded receiving bores 218 provided in the cover structure 214.

A pistol grip handle 220 includes a suitable actuating trigger 222 operating in a manner analogous to the trigger 154 of the reader unit 100 as described in FIG. 1, and no further details with regard thereto are set forth herein. The reader unit 200 may be connected to a suitable power supply (not shown) in the event that no batteries are employed, by means of a cable connector 224, and which also leads to a suitable decoding electronics for conveying signals thereto regarding the information received from the bar code symbol located on a target which is being scanned by the unit 200.

In essence, the operation of the bar code reader unit 200 is identical or at least substantially similar to that referred to with respect to FIG. 1 and the prior art identified as applicant's earlier U.S. patents, the disclosures of which are incorporated herein by reference, and consequently is not described in further detail hereinbelow.

However, in order to reduce the number of parts, and resultingly the costs of the laser scanning device 200, the latter contemplates the provision of the inventive unitary structure for modularly mounting various laser and optics components, and integrally therewith in a flexible manner the scanning motor, particularly designed to avoid or greatly ameliorate any potential damage to the components, and especially the scanning motor, in the event that the unit 200 is inadvertently dropped.

Figure 5:
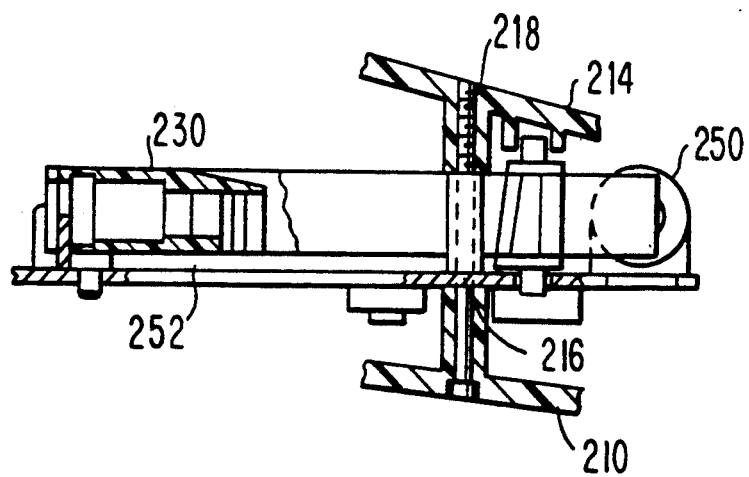
FIG. 5 illustrates a longitudinal sectional side view through a unitary structure with an integral scanning motor, with the structure being adapted for mounting operative components of the laser scanning device, and forming a modular arrangement for insertion into the housing shown in FIG. 2.
Figure 6:
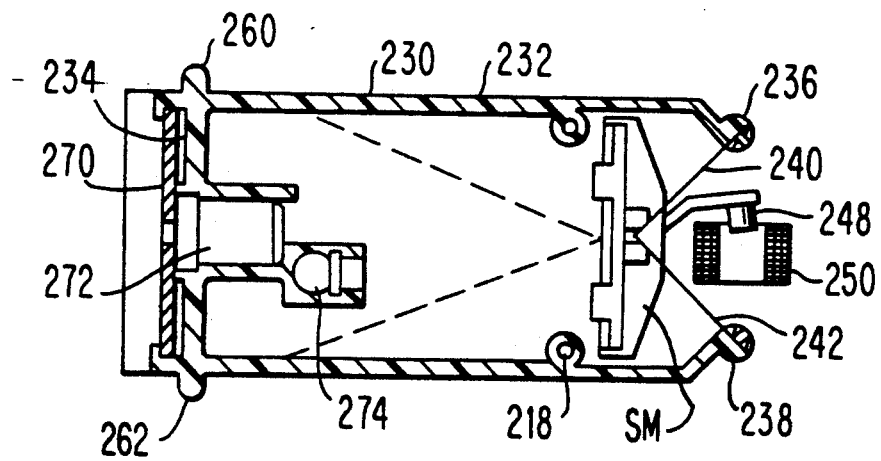
FIG. 6 illustrates a sectional view taken along line 6—6 in FIG. 5.
Figure 7:
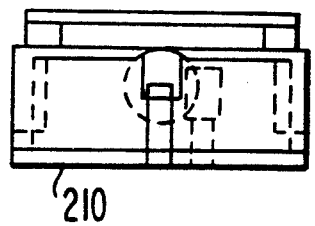
FIG. 7 illustrates an end view of the unitary structure of FIG. 5.

Hereby, referring to FIGS. 5 through 7, the invention illustrates unitary structure 230 in the form of a framework, preferably constituted from a rigid lightweight plastic, whereby the frame includes sidewalls 232 and an end wall 234 joining the sidewalls, having a heat sink 270 fastened thereto, and which end wall is adapted to provide a retainer or supporting structure for a laser arrangement 272 and for a photodetector 274, as shown in FIG. 6.

The opposite ends of the sidewalls 232 of the framework 230, as shown in FIG. 6, include keepers in the shape of essentially resilient or flexible arm members 236, 238 which are each adapted to respectively engage a Mylar film spring 240 and 242 of a scanning motor SM, such as a Mylar film resonant motor mounting a mirror forming a portion of the optics of the device. If desired, although not necessarily, the entire unit, including a magnet 248 and magnet coil 250, and the various components of the laser assembly which are fastened to the front end 234 of the framework 230, are adapted to be supported on a printed circuit board 252 containing the appropriate circuitry for the operative connections of the laser scanning device 200 as is known in the technology. Hereby, the entire array of components which are mounted on the framework 230 and the integral flexibly supported scanning motor SM, and possibly together with the printed circuit-board 252, is adapted to be introduced as a compact modular unit into the interior space of the housing portion 212, as shown in FIG. 2, and fixedly positioned therein, in that the lower end of the framework may be provided with locating pin members extending through the printed circuit board 252 and lateral guide extensions 260 and 262 which contact the inner wall surfaces of the interior space in the upper portion 212 of the housing 210, and with the cover or canopy 214 of the housing being fastened to the lower housing portion by means of the fasteners 216 engaging into the threaded bores 218.

Hereby, the resilient support of the scanning motor on the flexible arm members 236 and 238 which are integral with the unitary framework structure 230, and through the intermediary of the Mylar film springs 248 and 250, enables shock loads or impacts encountered by the laser scanning device 200 to be readily assumed by the framework and flexible arms 236, 238 and dissipated without being transmitted to the scanning motor, thereby providing a protective arrangement for the latter.

Pursuant to a somewhat modified embodiment of the unitary framework structure 230, in the event that the scanning motor, rather than being a Mylar film resonant motor which is integrally connected to the flexible arms 236 and 238 through the intermediary of Mylar film springs 248 and 250, is constructed of a motor of the type which possesses bearings, such as a D.C., galvo or stepper motor; rather than employing the two integral flexible arms 236, 238, the framework 230 may be provided with only a single flexible arm which is adapted to form a bearing support or even form the bearing itself for the laser scanning motor, such as a D.C., galvo or stepper motor, and to thereby constitute the integral flexible mounting for the motor which lessens the danger of the motor being damaged in the case of an inadvertent dropping of the laser scanning unit.

From the foregoing, it becomes readily apparent that the inventive arrangement incorporating a unitary structure for supporting various of the laser scanning and optical components, and concurrently providing for an integral resilient shock-absorbing mounting for a scanning motor is of an inexpensive and dependable modular construction of fewer components, which is readily insertable into the housing of a laser scanning device; for example, such as a hand-held, gun-shaped bar code reader unit of the type contemplated and disclosed herein.

While there has been shown and described what are considered to be preferred embodiments of the invention, it will of course be understood that various modifications and changes in form or detail could readily be made without departing from the spirit of the invention. It is therefore intended that the invention not be limited to the exact form and detail herein shown and described, nor to anything less than the whole of the invention herein disclosed as hereinafter claimed.

What is claimed is:

1. A laser scanning device for projecting a laser beam against a target having information thereon which is to be scanned by said laser beam, said device comprising: housing means enabling manual handling of said device; and a unitary framework structure insertable into said housing means, and operative for modularly mounting operative components of said laser scanning device, including laser generating means, optical means, photodetector means and a scanning motor for said laser scanning device, said unitary framework structure including flexible external shock-absorbing means integrally formed with said structure, and operative for resiliently supportably mounting said scanning motor on said structure against external impacts and shock loads imparted to said device prior to said external impacts and shock loads being transmitted to said scanning motor.

2. A laser scanning device as claimed in claim 1, wherein said unitary structure upon insertion into said housing means is supportable on a printed circuit board having circuitry thereon for completing operative interconnections of said operative components of the laser scanning device.

3. A laser scanning device as claimed in claim 1, wherein said flexible shock absorbent means comprises at least one flexible arm member; and resilient spring means interconnecting said scanning motor and said at least one flexible arm member.

4. A laser scanning device as claimed in claim 3, comprising two of said flexible arm members formed on said unitary framework structure each on an opposite side of said scanning motor, and a pair of said resilient spring means each engaging said scanning motor and respectively one of said arm members.

5. A laser scanning device as claimed in claim 4, wherein said scanning motor comprises a film resonant motor, each said resilient spring means comprising a film spring.

6. A laser scanning device as claimed in claim 3, wherein said at least one flexible arm member comprises a resilient bearing support for bearings of said scanning motor.

7. A laser scanning device as claimed in claim 3, wherein said at least one flexible arm member comprises a bearing support for a bearing of said scanning motor.

8. A laser scanning device as claimed in claim 3, wherein said unitary framework structure comprises a lightweight plastic frame having substantially rigid wall portions for mounting said laser generating means and photodetector means, and wherein said at least one flexible arm member is modularly insertable with said operative components into said housing mean as a pre-assembled unit.

9. A laser scanning device as claimed in claim 1, wherein said scanning motor comprises a D.C. motor.

10. A laser scanning device as claimed in claim 1, wherein said scanning motor comprises a galvo motor.

11. A laser scanning device as claimed in claim 1, wherein said motor comprises a stepper motor.

12. A laser scanning device as claimed in claim 1, wherein said housing means comprises a gun-shaped lightweight, plastic structure having a pistol grip which is manually supportable by a user.

13. A laser scanning device as claimed in claim 1, wherein said scanning device comprises a bar code reader for reading a bar code symbol on the target.

14. A method of arranging operative components in a laser scanning device utilized for projecting a laser beam against a target having information thereon which is to be scanned by said laser beam, wherein said device includes housing means enabling manual handling of said device, comprising the steps of: inserting a unitary framework structure into said housing means for modularly mounting operative components of said laser scanning device, including laser generating means, optical means, photodetector means and a scanning motor for said laser scanning device; and resiliently mounting said scanning motor on flexible external shock-absorbing means integrally formed with said unitary framework structure for resiliently supportably mounting said scanning motor on said structure against external impacts and shock loads imparted to said laser scanning device prior to said external impacts and shock loads being transmitted to said scanning motor.

15. A method as claimed in claim 14, wherein said unitary framework structure and said operative components of said laser scanning device are supportable on a printed circuit board for positioning in said housing means.

16. A method as claimed in claim 15, wherein said flexible shock-absorbing means is configured as at least one flexible arm member integral with said unitary framework structure; and the step of interconnecting said scanning motor and said at least one flexible arm member with resilient spring means for the shock-absorbent mounting of said scanning motor on said unitary framework structure.

17. A method as claimed in claim 16, comprising the steps of providing two of said flexible arm members on said unitary framework structure each on an opposite side of said scanning motor, and providing a pair of said resilient spring means each engaging said scanning motor and respectively one of said arm members.

18. A laser scanning device as claimed in claim 17, wherein said scanning motor comprises a film resonant motor, each said resilient spring means comprising a film spring.

19. A method as claimed in claim 14, wherein said housing means is configured as a gun-shaped, lightweight, plastic structure having a pistol grip which is manually supportable by a user.

20. A method as claimed in claim 14, wherein said scanning device comprises a bar code reader for reading a bar code symbol on the target.

21. A method as claimed in claim 14, wherein said scanning motor comprises a D.C. motor.

22. A method as claimed in claim 14, wherein said scanning motor comprises a galvo motor.

23. A method as claimed in claim 14, wherein said motor comprises a stepper motor.

* * * * *